Patented Apr. 4, 1950

2,502,424

UNITED STATES PATENT OFFICE 2,502,424

3-ACYLAMINO-4-CARBOALKOXY-2-ω-R-ALKYLTHIOPHENES

Lee C. Cheney, Syracuse, N. Y., and John Robert Piening, Detroit, Mich., assignors to Parke, Davis & Company, Detroit, Mich., a corporation of Michigan No Drawing. Original application December 23, 1944, Serial No. 569,640. Divided and this application April 8, 1946, Serial No. 660,402

5 Claims. (Cl. 260—329)

This invention relates to the preparation of new compounds useful as intermediates for the synthesis of pharmaceuticals particularly compounds possessing biotin and possible anti-biotin activity.

This application is a division of our application Serial No. 569,640, filed December 23, 1944, now Patent No. 2,466,004 issued April 5, 1949, and relates more particularly to the preparation of 3-acylamino-4-carboalkoxy-2-ω-R-alkylthiophenes. These new acylamino compounds may be prepared by acylating 3-amino-4-carboalkoxy-2-(ω-substituted-alkyl)-thiophenes by a process which may be represented as follows:

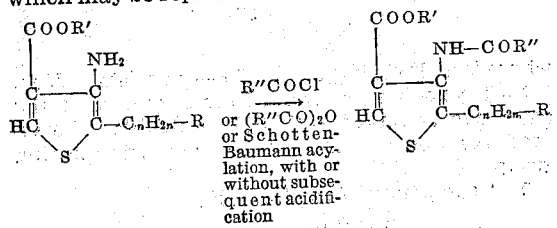

R in these formulas represents a radical of the class —COOH, —COOM, alkoxy, aralkoxy and aryloxy, where M is a salt-forming basic group or metal, such as sodium or other alkali metal, alkaline earth metal, magnesium, ammonium and substituted ammonium, such as monoalkylammonium and dialkylammonium. R' is lower alkyl; R"CO— is an organic carboxylic acid acyl radical.

The starting materials for this invention, namely the 3-amino-4-carboalkoxy-2-(ω-substituted-alkyl) thiophenes may be prepared by methods disclosed in our copending application, Serial No. 569,639, filed December 23, 1944, now Patent No. 2,443,598 issued June 22, 1948.

The following examples illustrate the invention.

Example 1

3 - benzoylamino - 4 - carbethoxy - 2 - thiophenevaleric acid.—A cooled solution of 2.71 g. (0.01 mole) of 3-amino-4-carbethoxy-2-thiophenevaleric acid in 25 ml. of dry chloroform is treated with 1.4 ml. of benzoyl chloride. The mixture is protected by a calcium chloride tube and refluxed on the steam bath for 24 hours. Following removal of solvent by steam distillation, the residual brown oil is dissolved in ether, and the ether solution is extracted thrice with 5% sodium bicarbonate solution. The combined alkaline extracts are cooled, acidified to Congo red with dilute hydrochloric acid and extracted twice with ether. Combined ether extracts are dried with anhydrous sodium sulfate, the ether is evaporated and the residue is shaken with 200 ml. of petroleum ether (B. P. 35–60° C.) for the removal of benzoic acid. The resulting light tan solid is filtered. Recrystallization from dilute alcohol yields 2.77 g. (81%) of cream-colored needles, M. P. 126.5–127.5° C., having the formula

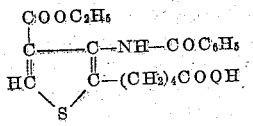

Anal.—Calcd. for $C_{19}H_{21}O_5NS$: C, 60.77; H, 5.63. Found: C, 60.70; H, 5.53.

Example 2

Ethyl 3-benzoylamino-2-γ-phenoxypropyl-4-thiophene-carboxylate.—To a warm solution of 14.1 g. (0.046 mole) of 3-amino-4-carbethoxy-2-γ-phenoxypropyl-thiophene, M. P. 56–57° C. in 100 ml. of glacial acetic acid is added 100 ml. of a saturated solution of sodium acetate. The well-stirred suspension is cooled in an ice bath and 8 ml. (9.7 g.) (0.069 mole) of benzoyl chloride is added dropwise. Lumps of solid soon separate. After stirring for 40 minutes the suspension is filtered and washed with ice water. The granular product is dissolved in 180 ml. of hot glacial acetic acid, treated with 70 ml. of a saturated solution of sodium acetate, cooled in ice and again treated with 8 ml. of benzoyl chloride. As soon as the suspension solidifies the ice bath is removed, 50 ml. of water is added and the mixture is stirred at room temperature for 3.5 hours. Then 100 ml. of water is added and the suspension is cooled, filtered, washed with cold water and desiccated in vacuum over $P_2O_5$. Crystallization from alcohol following Darco treatment produces 15.7 g. (83% yield) of fine ivory crystals, M. P. 97–98° C. A sample of the compound is recrystallized from alcohol (Darco) as colorless needles, M. P. 98–99° C.

Anal.—Calcd. for $C_{23}H_{23}O_4NS$: C, 67.5; H, 5.66. Found: C, 67.38; H, 5.91.

Its formula is,

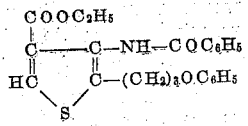

Example 3

Ethyl 3-benzoylamino-2-γ-benzyloxypropyl-4-thiophene-carboxylate.—A mixture of 2.79 g.

(0.00875 mole) of 4-carbethoxy-3-amino-2-γ-benzyloxypropylthiophene, 13 ml. of dry chloroform and 1.2 ml. of benzoyl chloride is refluxed on the steam bath for 17 hours. The chloroform is removed by steam distillation. The water is poured from the oil after cooling. The oil is dissolved in alcohol and is given a treatment with Darco. The alcohol solution is concentrated after filtering from Darco and is treated with hot water until a faint turbidity remains. When cool, an oil separates out. Addition of a large volume of water precipitates more oil. After scratching and cooling for several hours the product begins to crystallize, yielding a tan material which is collected, dried and weighed. The weight of crude material is 3.4 g., yield 92%, M. P. 60° C. A sample is recrystallized three times from 80% ethanol to a melting point of 65–66° C.

Anal. — Calcd. for $C_{24}H_{25}O_4NS$: N, 3.31%. Found: N, 3.44%.

Its formula is,

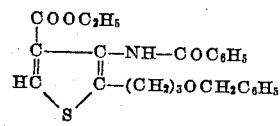

The 3-amino-4-carbethoxy-2-thiophenevaleric acid used in Example 1 as a starting material can be made from ethyl 3-amino-4-carbethoxy-2-thiophenevalerate of M. P. 43–44° C. as described in copending application of Lee C. Cheney and John Robert Piening, Serial No. 569,639, filed December 23, 1944. This 44° C. melting compound is prepared from the oxime of ethyl 4-carbethoxy - 3 - keto - 2 - tetrahydrothiophene - valerate by treatment of a dry ether solution of the latter with dry hydrogen chloride gas, converting the amine hydrochloride to the amine with alkali bicarbonate, and finally partially hydrolyzing the amine to the mono-ester. The oxime mentioned is made from ethyl 4-carbethoxy - 3 - keto - 2 - tetrahydrothiophenevalerate and hydroxylamine hydrochloride by the known procedure for producing oximes from their corresponding ketones. The 3-keto compound is, in its turn, made from the action of dry sodium ethylate in dry benzene on β-carbethoxyethyl-α,ω-dicarbethoxyamyl sulfide of formula,

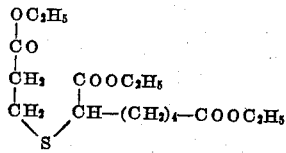

The cyclic 3-keto compound can be purified by way of its copper chelate salt.

The above mentioned sulfide is obtainable by reacting an alkaline solution of β-mercaptopropionic acid with α-chloropimelic acid. The α-chloropimelic acid is obtained by first reacting a solution of sodio ethyl malonate with ethyl Δ-chlorovalerate and hydrolyzing the tri-ester obtained into Δ-carboxybutylmalonic acid, thereafter using sulfuryl chloride to convert the butylmalonic acid compound to Δ-carboxybutylchloromalonic acid which can be decarboxylated by heat to α-chloropimelic acid of formula,

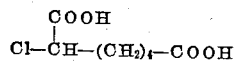

All of the above reactions for making the intermediate of Example 1 and also analogous intermediates for the other examples are described in United States applications of Lee C. Cheney and John Robert Piening, Serial No. 550,483 and Serial No. 550,484, filed August 21, 1944, both now abandoned, and Serial No. 551,619, filed August 28, 1944.

Numerous variations from the above examples, which are nevertheless within the scope of the invention, will occur to those skilled in the art. For example, in the first step wherein the 3-amino group is converted to an amide group, any suitable organic carboxylic acid acylating agent may be used, such as acetyl chloride, acetic anhydride, phenyl acetyl chloride, naphthoyl chloride as well as benzoyl chloride.

What we claim as our invention is:

1. A compound of the formula,

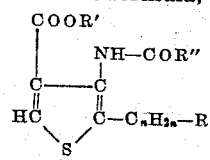

where the alkyl chain, $-C_nH_{2n}-$, consists of from 1 to 8 carbon atoms, where R is a radical of the class consisting of $-COOH$, $-COOM$, alkoxy, aralkoxy and aryloxy, M being a salt-forming basic group, R' is lower alkyl and R''CO— is an organic carboxylic acid acyl radical.

2. A compound of the formula,

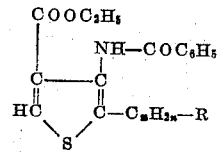

where the alkyl chain, $-C_nH_{2n}-$, consists of from 1 to 8 carbon atoms, and R is a radical of the class consisting of $-COOH$, $-COOM$, alkoxy, aralkoxy and aryloxy, M being a salt-forming group.

3. A compound of the formula,

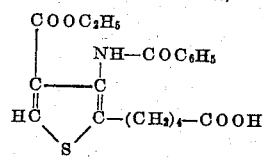

4. A compound of the formula,

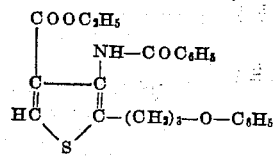

5. A compound of the formula,

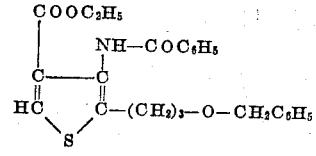

LEE C. CHENEY.
JOHN ROBERT PIENING.

REFERENCES CITED

The following references are of record in the file of this patent:

Karrer: Helv. Chim. Acta, vol. 27, pages 133 and 134, Feb. 1, 1944.

Shriner and Fuson, Identification of Organic Compounds, page 117, Wiley, N. Y., 1935.